United States Patent
Yonemoto et al.

(10) Patent No.: US 11,679,992 B2
(45) Date of Patent: Jun. 20, 2023

(54) METHODS FOR PREPARING PARTICLE PRECURSOR, AND PARTICLE PRECURSOR PREPARED THEREBY

(71) Applicant: Microvast Power Systems Co., LTD., Huzhou (CN)

(72) Inventors: Bryan Yonemoto, Clearwater, FL (US); Xiao Zhang, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 26 days.

(21) Appl. No.: 17/043,623

(22) PCT Filed: Jun. 11, 2019

(86) PCT No.: PCT/CN2019/090669
§ 371 (c)(1),
(2) Date: Sep. 29, 2020

(87) PCT Pub. No.: WO2019/238033
PCT Pub. Date: Dec. 19, 2019

(65) Prior Publication Data
US 2021/0032122 A1 Feb. 4, 2021

Related U.S. Application Data

(60) Provisional application No. 62/683,042, filed on Jun. 11, 2018, provisional application No. 62/683,040, filed on Jun. 11, 2018.

(51) Int. Cl.
*C01G 53/00* (2006.01)
*B01J 4/00* (2006.01)
(Continued)

(52) U.S. Cl.
CPC ............ *C01G 53/006* (2013.01); *B01J 4/008* (2013.01); *B01J 19/0086* (2013.01);
(Continued)

(58) Field of Classification Search
CPC ........ C01G 53/006; C01G 53/06; B01J 4/008; B01J 19/0086; H01M 4/0497; H01M 4/13;
(Continued)

(56) References Cited

U.S. PATENT DOCUMENTS 8,216,676 B2 7/2012 Paulsen et al.
9,406,930 B2 8/2016 Fukui et al.
(Continued)

FOREIGN PATENT DOCUMENTS

CN 102569773 A 7/2012
CN 103236537 A 8/2013
(Continued)

OTHER PUBLICATIONS

Gary M. Koenig, Jr., Ilias Belharouak, Haixai Deng, Yang-Kook Sun, Khalil Amine, "Composition-Tailored Synthesis of Gradient Transition Metal Precursor Particles for Lithium-Ion Battery Cathode Materials", Chemistry of Materials, Mar. 9, 2011, pp. 1954-1963, vol. 23, Issue No. 7, American Chemical Society Publications, Washington.

*Primary Examiner* — James A Fiorito
(74) *Attorney, Agent, or Firm* — Cheng-Ju Chiang (57) ABSTRACT

The invention relates to a method for preparing core-shell structured particle precursor under a co-precipitation reaction. In this method, by controlling the feeding of different types of anion compositions and/or cation compositions, and adjusting the pH to match with the species, precipitated particles are deposited to form a precipitated particle slurry, filtering, and drying the precipitated particle slurry to yield the particle precursor. The invention also provides a particle precursor which includes a core-shell structure. The shell is made of gradient anions and/or cations. Such particle precursor can be used to prepare cathode of lithium-ion battery.

13 Claims, 3 Drawing Sheets

(51) Int. Cl.
*C01G 53/06* (2006.01)
*H01M 4/04* (2006.01)
*H01M 4/131* (2010.01)
*H01M 4/1391* (2010.01)
*H01M 4/525* (2010.01)
*B01J 19/00* (2006.01)
*H01M 4/139* (2010.01)
*H01M 4/13* (2010.01)
*H01M 10/0525* (2010.01)
*H01M 4/02* (2006.01)

(52) U.S. Cl.
CPC .......... *C01G 53/06* (2013.01); *H01M 4/0497* (2013.01); *H01M 4/13* (2013.01); *H01M 4/131* (2013.01); *H01M 4/139* (2013.01); *H01M 4/1391* (2013.01); *H01M 4/525* (2013.01); *B01J 2204/002* (2013.01); *B01J 2219/00177* (2013.01); *B01J 2219/00186* (2013.01); *C01P 2002/52* (2013.01); *C01P 2004/03* (2013.01); *C01P 2004/84* (2013.01); *C01P 2006/40* (2013.01); *H01M 10/0525* (2013.01); *H01M 2004/028* (2013.01)

(58) Field of Classification Search
CPC .... H01M 4/131; H01M 4/139; H01M 4/1391; H01M 4/525
See application file for complete search history.

(56) References Cited

U.S. PATENT DOCUMENTS

| | | |
|---|---|---|
| 9,876,226 B2 | 1/2018 | Paulsen et al. |
| 2013/0202966 A1 | 8/2013 | Yu et al. |
| 2014/0377660 A1 | 12/2014 | Fukui et al. |
| 2016/0359165 A1 | 12/2016 | Kim et al. |
| 2017/0288262 A1 | 10/2017 | Choi et al. |

FOREIGN PATENT DOCUMENTS

| | | |
|---|---|---|
| CN | 103326016 A | 9/2013 |
| CN | 103794752 A | 5/2014 |
| CN | 103794783 A | 5/2014 |
| CN | 103811748 A | 5/2014 |
| CN | 104779383 A | 7/2015 |
| CN | 104852026 A | 8/2015 |
| CN | 104979553 A | 10/2015 |
| CN | 106207140 A | 12/2016 |
| CN | 108140819 A | 6/2018 |
| EP | 3282506 A1 | 2/2018 |
| RU | 2011148908 A | 6/2013 |
| RU | 2634306 C2 | 10/2017 |
| WO | 2016/055910 A1 | 4/2016 |
| WO | 2016/204563 A1 | 12/2016 |

METHODS FOR PREPARING PARTICLE PRECURSOR, AND PARTICLE PRECURSOR PREPARED THEREBY

TECHNICAL FIELD

The present disclosure relates to a method for preparing a lithium-ion battery cathode, particularly, to a method for preparing particle precursor without using organic chelating additives to alter the precipitation rates, and a particle precursor prepared by the method above, and also relates to a method for preparing cathode active particles therefrom.

BACKGROUND ART

The lithium-ion battery, originally commercialized in early 1990s, has come to dominate the energy storage market for hand-held, electronic consumer devices. This is because the battery is rechargeable and has high mass and volume energy density. Lithium-ion batteries are also being extensively investigated for electric vehicle applications currently. In electric vehicles, it is desirable that the battery cathode has high capacity, high power, improved safety, long cycle life, low toxicity and lower production costs. However, current cathode materials generally fail to meet all these requirements.

One reason why current cathode material fails to meet all the desired characteristics is that it is difficult to process complex multi-metal materials. As a matter of fact, one method suitable for processing certain transition-metal elements may not suit for processing other transition-metal elements which are desired to be integrated into the cathode particles. Hence, at such circumstance, other additives or agents would be needed to join the processing. For example, when preparing transition-metal precursor particles by a co-precipitation process, Ni—Mn—Co (abbr. NMC) is desired to be combined with aluminum (abbr. Al) to form the cathode precursor particles. However, Al would not precipitate homogeneously with the Ni—Mn—Co under conventional hydroxide processing conditions. Hence, complicated additives and complexing agents would have to be added into the reactor and join the reaction therein. This would bring the following disadvantages: first, the costs would be increased due to the feeding of the additives and complexing agents; second, removal of such additives and complexing agents would need extra work and would lead to waste of water.

When synthesizing NMC particles by such co-precipitation method, several anion species would inevitably exist therein, such as oxalate, carbonate and hydroxide. Generally, hydroxide is the most preferable anion when using the co-precipitation method in industry, since it yields high-density particles. Such high-density particles are beneficial for high energy density cells. However, the existence of such anions would do no good for the improvement of cathode electrochemical performance since they would lead to changes in porosity, crystallite size, or local atomic ordering. To achieve high electrochemical performance, it is desirable to select suitable processing conditions for certain cathode element (i.e., Al) combinations based on electrochemical differences of various co-precipitation anions.

However, the addition of Al into the metal hydroxide cathode precursor is challenging. The solubility product constant (Ksp) of Al is orders of magnitudes lower at the pH ranges typically of NMC based particles, which result in fast and excessive precipitation and unusual secondary particle growth. As examples, four conventional methods of depositing Al are described below.

U.S. Pat. No. 9,406,930B discloses a method to deposit NCA (abbr. Ni—Co—Al) compositions as a shell on a core of NMC nucleates, during which the pH value is adjusted to a lower value to facilitate the deposition of Al. As a matter of fact, the pH value of below 10 is suitable for Al deposition. However, in such method, the pH value is 12 to 14 at a reference liquid temperature of 25° C., much higher than 10. Hence, such method results in uneven Al deposition and needs long reaction time, which leads to greatly cumulated particle surface area. None of these is desirable.

U.S. Pat. No. 8,216,676B2 discloses a method in which Al is deposited on $LiCoO_2$, $LiMn_2O_4$ and NMC cathode active material particles. During which the ratio of Co to the transition metal is controlled to be greater than 50% while adjusting the pH near 9. As a result, the coating is only present on the particle surface, not within the particle during the deposition, which is performed on a final material. Hence, such method fails to integrate Al within the particle structure, especially for Ni-rich materials with little or no Co present.

U.S. Pat. No. 9,876,226B provides precursor cathode particles which are dry-coated with smaller alumina particles. Such method relies on Al ions to diffuse into the structure during heating. However, for Ni-rich cathode materials, high heat treatment would result in formation of inactive rock-salts, which degrades the cathode performance. Hence, it is typically not desirable.

CN106207140A discloses a method in which the aluminum (Al) is added during co-precipitation to NC (abbr. Ni—Co) materials at the existence of a special complexing agent or chelator. Such complexing agent brings complexity to the process, and results in additional treatment of waste water. The feeding of organic chelator would adversely affect the reaction time. However, such method fails to avoid using such complexing agent or chelator.

Meanwhile, another problem to achieve high electrochemical performance is that during the preparation of active material, water produced from hydroxide-based cathodes would cause corrosion to processing equipment, which may damage the cathode particle performance, since high water vapor contents are associated with large grains observed on the particles after calcination. Generally, one method to solve such problem is to increase the volumetric flowrates of the reaction gas within the reactor. However, it could only accelerate the removal rate, but fails to mitigate the water generation. Further, such method also increases production costs, and could not reduce the downstream corrosion. In fact, in some cases the corrosion may increase since more oxidative gas is used. On one hand, using much oxidative gas could promote the water removal, on the other hand, it could also increase the corrosion to the processing unit. Hence, removal of some water generation under the premise of not leading to corrosion is still not solved.

Further, there is still other problem remained unsolved for lithium-ion cathode materials. On one hand, since cobalt (abbr. Co) performs a dumbbell configuration due to the movement of its atoms, such configuration makes the movement of Ni/Li switching hard, which in turn block the migration path of the Ni and Li. Because of this, Co decreases the site exchange between the transition metals such as Ni to Li, and further benefit for better electrochemical performance. On the other hand, transition metal composition, such as Co, has a major influence on the costs since Co is the most expensive transition metal. Hence, it is desirable to abandon Co from the structure of cathode particles while improving the electrochemical performance simultaneously.

Technical Problem

First, it is difficult to add Al into metal hydroxide cathode precursor while achieving high electrochemical performance. Second, during the preparation of active particles, water produced from hydroxide-based cathodes would cause corrosion to the equipment. Third, Co is expensive which makes the cost much higher.

Technical Solution

The present disclosure provides a method for preparing core-shell structured particle precursor, the core-shell structured particle precursor may be combined with metals such as lithium to form cathode active particles which can be used for lithium-ion batteries.

The method for preparing a core-shell structured particle precursor includes at least the following steps: from an initial time $t_0$ to a first time $t_1$, feeding a first anion composition $B_1$ through a first container into a reactor, and feeding a first cation composition $A_1$ through a second container into the reactor, the first anion composition $B_1$ and the first cation composition $A_1$ reacting and precipitating in the reactor, $t_1$ comes after $t_0$, $t_0=0$; at the first time $t_1$, the first container is full of the first anion composition $B_1$, the second container is full of the first cation composition $A_1$; feeding a second anion composition $B_2$ and the first anion composition $B_1$ through the first container into the reactor from the first time $t_1$ to a second time $t_2$, $t_2$ comes after $t_1$, during which the first anion composition $B_1$ is gradually switched to the second anion composition $B_2$; and feeding at least the first cation composition $A_1$ through the second container into the reactor from the first time $t_1$ to the second time $t_2$, thereby forming a precipitated particle slurry; and filtering, and drying the precipitated particle slurry to yield the particle precursor.

In one embodiment, the step that the first anion composition $B_1$ is gradually switched to the second anion composition $B_2$ includes the following steps: at the first time $t_1$, the first container is full of the first anion composition $B_1$; gradually feeding the second anion composition $B_2$ into the first container from the first time $t_1$ to a second time $t_2$, $t_2$ comes after $t_1$, where the first anion composition $B_1$ and the second anion composition $B_2$ form a dynamic mixture; and feeding the dynamic mixture through the first container into the reactor from the first time $t_1$ to the second time $t_2$, at the second time $t_2$, the first container is mainly full of the second anion composition $B_2$.

In one embodiment, method further includes the following step: feeding the second anion composition $B_2$ and the first cation composition $A_1$ into the reactor from the second time $t_2$ to a third time $t_3$, $t_3$ comes after $t_2$.

In one embodiment, during the initial time $t_0$ to the second time $t_2$, only the first cation composition $A_1$ is fed into the reactor.

In another embodiment, from the initial time $t_0$ to the first time $t_1$, only the first cation composition $A_1$ is fed through the second container into the reactor; and from the first time $t_1$ to the second time $t_2$, feeding a second cation composition $A_2$ and the first cation composition $A_1$ through the second container into the reactor, during which the first cation composition $A_1$ is gradually switched to the second cation composition $A_2$.

In still another embodiment, from the initial time $t_0$ to a switching time $t_s$, only the first cation composition $A_1$ is fed through the second container into the reactor, $t_s$ is between the first time $t_1$ and the second time $t_2$; and from the switching time $t_s$ to the second time $t_2$, feeding a second cation composition $A_2$ and the first cation composition $A_1$ through the second container into the reactor, during which the first cation composition $A_1$ is gradually switched to the second cation composition $A_2$. The present disclosure still provides a core-shell structured particle precursor, which is prepared by the methods above. The core-shell structured particle precursor includes a core and a shell enwrapping the core, the core is made of precipitations of a first anion composition $B_1$ and a first cation composition $A_1$, the shell is gradient and is made of co-precipitations of the first anion composition $B_1$, a second anion composition $B_2$ and at least the first cation composition $A_1$, the first anion composition $B_1$ is gradually changed to the second anion composition $B_2$ in the shell from inner to outer.

In one embodiment, the shell further includes a second cation composition $A_2$, the first cation composition $A_1$ is gradually changed to the second cation composition $A_2$ within the shell.

In another embodiment, the particle precursor further includes a periphery part enwrapping the shell, the periphery part is made of precipitations of the second anion composition $B_2$ and the first cation composition $A_1$.

In still another embodiment, the shell is divided into an intermediate part and a gradient part based on the cations, the first anion composition $B_1$ is gradually changed to the second anion composition $B_2$ within the shell, the intermediate part further includes the first cation composition $A_1$, the gradient part further includes the first cation composition $A_1$ and the second cation composition $A_2$, the first cation composition $A_1$ is gradually changed to the second cation composition $A_2$ within the gradient part. In any of the embodiment of this invention, at time $t_1$ when the second anion composition $B_2$ is to be fed into the first container, the description "the first container is full of the first anion composition $B_1$" is not just mean that there is only the first anion composition $B_1$ in the first container but mean that the container has the first anion composition $B_1$ and also small amount of the second anion composition $B_2$ at the critical time $t_1$.

In any of the embodiment of this invention, at time $t_1$ and/or $t_s$ when the second cation composition $A_2$ needs to be fed into the second container, the description "the first container is full of the first cation composition $A_1$" does not just mean that there is only the first cation composition $A_1$ in the first container but means that besides the first cation composition $A_1$, there is also small amount of the second cation composition $A_2$ at the critical time $t_1$ and/or $t_s$.

In any of the embodiment of this invention, at the time $t_1$, $t_2$, and/or $t_3$, when adding the second anion composition $B_2$, there may still exits small amount of the first anion composition $B_1$ in the first container. In any of the embodiment of this invention, at the time $t_1$, $t_2$, and/or $t_s$, when adding the second cation composition $A_2$, there may still exits small amount of the first cation composition $A_1$ in the first container.

Advantageous Effects

The method of the present disclosure has the following advantages:

Firstly, since different cations can be precipitated with different anions separately, the transition metal cations (dopants) that are incompatible with the core anion species under the processing conditions can be easily added to the particle precursor in the shell. And vice versa, wherein cations or other dopants that can only be compatible with the core anion under the processing conditions can be added to the particle before switching to an incompatible processing location for the shell. Particularly, $Al^{3+}$ can be added to the particle precursor during the co-precipitation under the premise that there is hydroxide in the solution which can form precipitation with $Al^{3+}$; in such conditions, no additional organic chelating additives are needed to remove $Al^{3+}$, and the precipitation kinetics are avoided to be slowed without chelating agents. Because of this, Ni-rich particles precursor can have Al dopant into the particle without using organic chelating additives, the Ni-rich particles precursor has a mole ratio of Ni to transitional metals higher than 0.7. The concentration of $Al^{3+}$ deposited into the particles can be adjusted based on the time feeding the $Al^{3+}$ dopants and the time when switching the anions.

Secondly, no matter where the gradient portion is located, in the core or in the shell, the concentration gradient of the anion species ensures that the transition between different anion species is smooth, that is, the transition from the former anion to the latter is not a sharp change, but a gradual switching. Because of this, the gradient portion endows the particle precursor a gradient surface, which makes the transition from the portion having only the first anion to the portion having both the first and second anions becomes more smoothly. The particle precursor is more solid during later processing, and cracks or delamination would not occur. This has great improved the duration and life-span of the cathode particles prepared based on the particle precursor.

Thirdly, due to the feeding of elements Ni, Mn, Al etc. into the reaction, the cobalt content will be below 20% of the total transition metal ratio, and preferably below 5%, and more preferably 0% cobalt will be present in the cathode precursor particle. Because of this, the cost is greatly decreased.

MODE FOR THE INVENTION

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the embodiments below, particle precursors with anion-gradient core-shell structures will be prepared by a co-precipitation reaction, and the solution volume where the reaction takes place is defined as a precipitation zone.

The method for preparing such anion-gradient core-shell structured particle precursors includes the following steps: firstly, vacuuming the precipitation zone and/or filling with He, $N_2$ or Ar gas, for example, blanketing or bubbling the precipitation zone by He, $N_2$ or Ar gas.

Next, introducing a stream (b) into a reactor for providing precipitating anions, feeding stream (a) for providing transitional-metal cations, whereby the precipitating anions and the transitional-metal cations react to form a precipitated particle slurry; the stream (a) includes at least a first cation composition $A_1$; the stream (b) includes at least a first anion composition $B_1$ and a second anion composition $B_2$, both are fed simultaneously from an initial time $t_0$ to a second time $t_2$, a concentration of the first anion composition $B_1$ is constant from the initial time $t_0$ to a first time $t_1$, and then the first anion composition $B_1$ is gradually switched to the second anion composition $B_2$ from the first time $t_1$ to the second time $t_2$, in which $t_1$ comes after to and $t_2$ comes after $t_1$. The initial time $t_0$ refers to a time when the first cation $A_1$ and the first anion $B_1$ are initially fed into the reactor and starts to precipitate, $t_0=0$. The first time $t_1$ refers to a critical time when both the first anion $B_1$ and the second anion $B_2$ start to be fed into the reactor and co-precipitation occurs.

Finally, filtering and drying the precipitated particle slurry to yield the particle precursor.

Particularly, the feeding of the stream (b) is as follows: firstly, feeding the first anion composition $B_1$ through a first container into the rector from the initial time $t_0$ to the first time $t_1$; since the first container have certain space to occupy liquids, it is filled with the first anion composition $B_1$ when reaching the first time $t_1$; secondly, feeding the second anion composition $B_2$ through a third container into the first container at a certain flowrate from the first time $t_1$ to the second time $t_2$, hence, the first anion composition $B_1$ and the second anion composition $B_2$ form a dynamic mixture in the first container, which is fed into the reactor through the first container from the first time $t_1$ to the second time $t_2$. At the second time $t_2$, the dynamic mixture includes mainly the second anion composition $B_2$. Hence, during such step, from the initial time $t_0$ to the first time $t_1$, the first anion composition $B_1$ is the only anion that is fed into the reactor, while from the first time $t_1$ to the second time $t_2$, the first anion composition $B_1$ is gradually switched to the second anion composition $B_2$.

Figure 1:
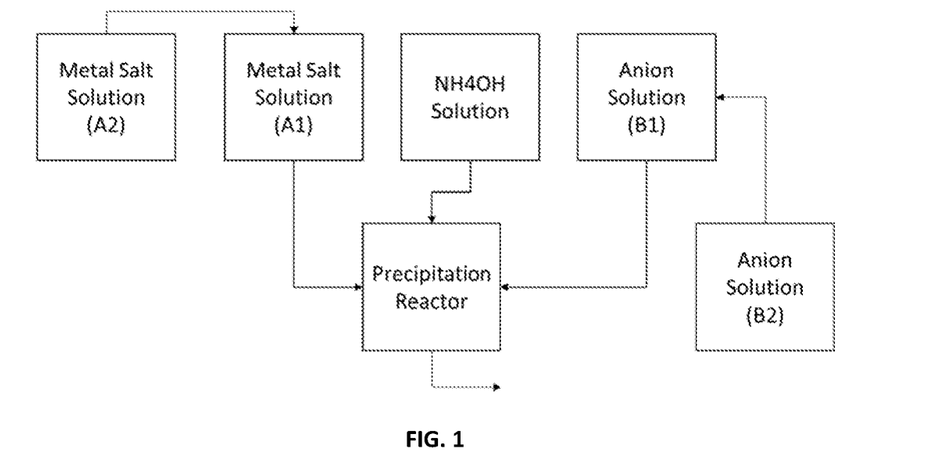
FIG. 1 shows a schematic view of the reaction device to form the full-gradient particle precursors in one embodiment of the present disclosure.

FIG. 1 shows a flow diagram of the method above in one embodiment. As shown in FIG. 1, in such embodiment, the first anion composition $B_1$ is fed through a first container directly to the reactor, while the second anion composition $B_2$ is continuously fed from the third container into the first container and mixed with the first anion composition $B_1$ to form a dynamic mixture in the first container, and then the dynamic mixture is further fed through the first container into the reactor.

In one embodiment, the first anion composition $B_1$ has a constant flowrate or concentration from the initial time $t_0$ to the first time $t_1$.

In the process of the present disclosure, the stream (b) functions to provide anions which would enter the precipitation particles, the concentration of the anions in stream (b) is 0.001-14 (mol anion/L). Meanwhile, the anion composition B; (i=1, 2, . . . ), i.e., $B_1$, or $B_2$ is selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$ or some combination of the species listed above. In one embodiment, the first anion composition $B_1$ is a solution entirely configured from hydroxide salts. In another embodiment, the second anion composition $B_2$ includes [$CO_3$] salts, [$C_2O_4$] salts, [OH] salts, or some combination of the species listed.

In one embodiment, the first anion composition $B_1$ includes hydroxide anion, a content of the hydroxide anion in the stream (b) is no less than 80 wt %. The second anion composition $B_2$ includes carbonate anion and/or oxalic anion, a content of the carbonate and/or oxalic anions is no less than 40 wt % in the steam (b).

With regard to the cations, in the present disclosure, stream (a) functions to provide transitional-metal cations. Stream (a) includes the cations for precipitation with a concentration from 0.001-6 mol cation/L. The cations provided by stream (a) is at least one selected from the group consisting of Mg, Ca, Zr, Ti, V, Cr, Mn, Fe, Co, Ni, Cu, Al or some combination of the species listed above. The cation(s) provided by stream (a) is in a form of sulfate, carbonate, chloride, nitrate, fluoride, oxide, hydroxide, oxyhydroxide, oxalate, carboxylate or acetate, phosphate or borate.

Figure 2:
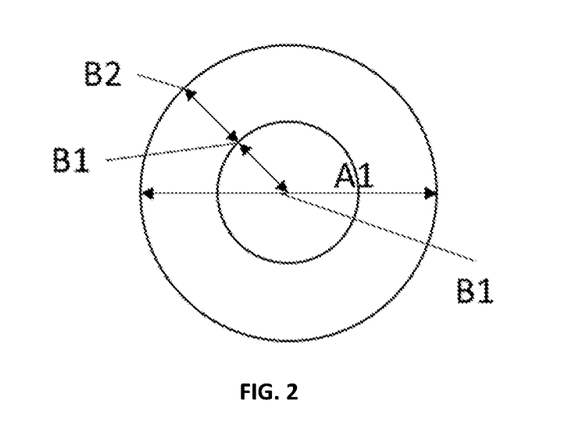
FIG. 2 shows a schematic view of a core-shell structured particle precursor of a first example, which has a core and a shell enwrapping the core, the core is made of only a first anion $B_1$, the shell is made of the first anion $B_1$ and a second anion $B_2$, in which the first anion $B_1$ is gradually switched to the second anion $B_2$, meanwhile a first cation $A_1$ is constant both in the core and the shell.
Figure 3:
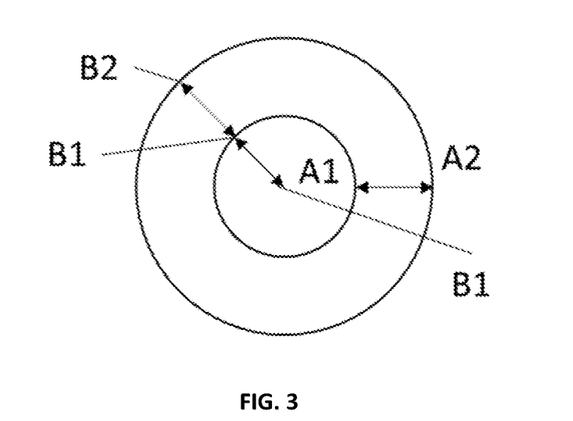
FIG. 3 shows a schematic view of a core-shell structured particle precursor of a second example, which has a core and a shell enwrapping the core, the core is made of a first anion $B_1$ and a first cation $A_1$, and the shell is made of the first anion $B_1$ and a second anion $B_2$, and the first cation $A_1$ and the second cation $A_2$, in which the first anion $B_1$ is gradually switched to the second anion $B_2$, meanwhile the first cation $A_1$ is also gradually switched to the second cation $A_2$.
Figure 4:
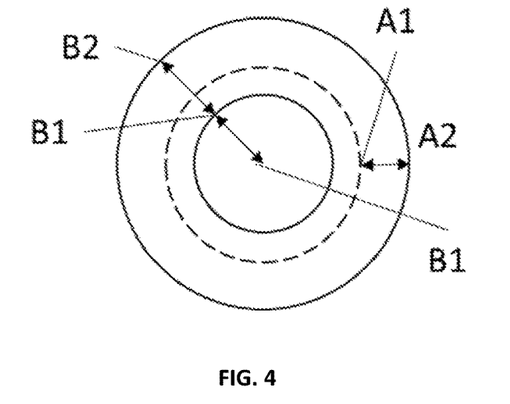
FIG. 4 shows a schematic view of a core-shell structured particle precursor of a third example, which has a core and a shell enwrapping the core, the core includes a first anion $B_1$ and a first cation $A_1$; the shell includes the first anion $B_1$, a second anion $B_2$, the first cation $A_1$ and a second cation $A_2$, in which the first anion $B_1$ is gradually switched to the second anion $B_2$, meanwhile the first cation $A_1$ is constant for a certain period and then gradually switched to the second cation $A_2$.
Figure 5:
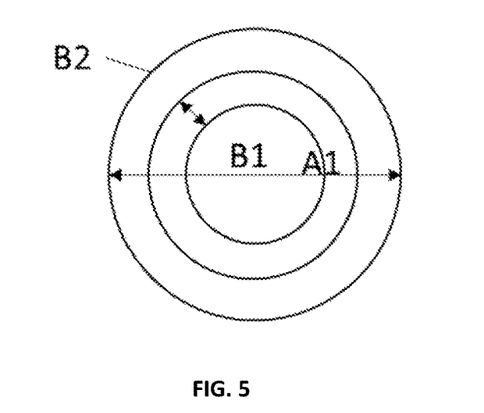
FIG. 5 shows a schematic view of a core-shell structured particle precursor of a fourth example, which has a core and a shell, a first cation $A_1$ is constant through the particle precursor, meanwhile the core includes a first anion $B_1$, the shell includes the first anion $B_1$ and a second anion $B_2$, in which the first anion $B_1$ is gradually switched to the second anion $B_2$ in the shell; meanwhile, the particle precursor further includes an outer part enwrapping the shell, and the outer part includes the second anion $B_2$ and the first cation $A_1$.

Stream (a) has at least one cation composition species. In one embodiment, for example, as shown in FIGS. 2 and 5, stream (a) only has one cation, i.e., a first cation composition $A_1$. In another embodiment, for example, as shown in FIGS. 3-4, the stream (a) has a first cation composition $A_1$ and a second cation composition $A_2$. Optionally, during the method for preparing the core-shell structure particle precursor, additional streams (e . . . z) may also be introduced into the reactor to add additional species to the reaction, or to remove solvent through an in-situ thickening device.

Please note that in the present disclosure, the "core" and "shell" are named merely based on the anions distribution.

The method above produces a core-shell structured particle precursor, which includes a core and a shell enwrapping the core, as shown in FIGS. 2-5. The core is in the center of the particle precursor, which is made of precipitations formed by the first anion composition $B_1$ and the first cation composition $A_1$ from the initial time $t_0$ to the first time $t_1$, the first anion composition $B_1$ and the first cation composition $A_1$ have uniform concentration separately. The shell is in the periphery of the core, which is made of co-precipitations formed by the first anion composition $B_1$, the second anion composition $B_2$ and at least the first cation composition $A_1$, in which the first anion composition $B_1$ is gradually switched to the second anion composition $B_2$ from inner to outer.

In detail, in one embodiment, as shown in FIG. 2, the core-shell structured particle precursor includes a core and a shell, the core is made of precipitations formed by the first anion composition $B_1$ and the first cation composition $A_1$ fed from the initial time $t_0$ to the first time $t_1$, the shell is made of co-precipitations formed by the first anion composition $B_1$, the second anion composition $B_2$ and the first cation composition $A_1$ fed from the first time $t_1$ to the second time $t_2$, in which the first anion composition $B_1$ is gradually switched to the second anion composition $B_2$, meanwhile the first cation composition $A_1$ is constant.

As shown in FIG. 3, in another embodiment, the core-shell structured particle precursor includes a core and a shell, the core is made of precipitations formed by the first anion composition $B_1$ and the first cation composition $A_1$ fed from the initial time $t_0$ to the first time $t_1$, the shell is made of co-precipitations formed by the first anion composition $B_1$, the second anion composition $B_2$, the first cation composition $A_1$ and the second cation composition $A_2$ fed from the first time $t_1$ to the second time $t_2$, in which the first anion composition $B_1$ is gradually switched to the second anion composition $B_2$, meanwhile the first cation composition $A_1$ is gradually switched to the second cation composition $A_2$.

As shown in FIG. 4, in still another embodiment, the core-shell structured particle precursor includes a core and a shell, the core is made of precipitations formed by the first anion composition $B_1$ and the first cation composition $A_1$ fed from the initial time $t_0$ to the first time $t_1$, the shell is made of co-precipitations formed by the first anion composition $B_1$, the second anion composition $B_2$, the first cation composition $A_1$ and the second cation composition $A_2$ fed from the first time $t_1$ to the second time $t_2$, in which the first anion composition $B_1$ is gradually switched to the second anion composition $B_2$, meanwhile the first cation composition $A_1$ is still constant from the first time $t_1$ to a switching time $t_s$, and then gradually switched to the second cation composition $A_2$ from the switching time $t_s$ to the second time $t_2$. The switching time $t_s$ is between the first time $t_1$ and the second time $t_2$.

Hence, the shell in FIG. 4 is divided into two parts due to the difference in cations, i.e., a uniform cation part and a full-gradient cation part, the uniform cation part includes only the first cation composition $A_1$, and the full-gradient cation part includes the first cation composition $A_1$ and the second cation composition $A_2$, in which the first cation composition $A_1$ is gradually switched to the second cation composition $A_2$ from the switching time $t_s$ to the second time $t_2$.

As shown in FIG. 5, in yet another embodiment, the core-shell structured particle precursor includes three parts, a core, a shell and a periphery shell. The core and the shell are the same as that in FIG. 2. The difference from FIG. 2 is that the particle precursor in FIG. 5 further includes the periphery shell which is made of precipitations made by the second anion composition $B_2$ and the first cation composition $A_1$ fed from the second time $t_2$ to a third time $t_3$. The third time $t_3$ refers to a time when the reaction ends.

In the embodiments of FIGS. 2-5, during the precipitation of $B_1$ from the initial time $t_0$ to the first time $t_1$, the step of feeding the stream (b) includes the following step: feeding the first anion composition $B_1$ through the first container to the reactor from the initial time $t_0$ to the first time $t_1$, and the first container is in a state full of the first anion composition $B_1$.

During the co-precipitation of $B_1$ and $B_2$ from the first time $t_1$ to the second time $t_2$, at the first time $t_1$, the first container is filled with the first anion composition $B_1$, the first container is connected with the reactor; the step that the first anion composition $B_1$ is gradually switched to the second anion composition $B_2$ from the first time $t_1$ to the second time $t_2$ includes the following steps: feeding the second anion composition $B_2$ from the third container into the first container with a certain flowrate from the first time $t_1$ to the second time $t_2$, the first anion composition $B_1$ and the second anion composition $B_2$ form a dynamic mixture in the first container; and feeding the dynamic mixture into the reactor through the first container from the first time $t_1$ to the second time $t_2$, wherein at the first time $t_1$, the dynamic mixture fed into the reactor is mainly the first anion composition $B_1$, while at the second time $t_2$, the dynamic mixture is mainly the second anion composition $B_2$.

Besides, in the embodiment of FIG. 5, from the second time $t_2$ to the third time $t_3$, the second anion composition $B_2$ is further fed through the first container into the reactor.

Generally, the instantaneous concentration of anions being fed into the reactor from the first time $t_1$ to the second time $t_2$ can be described as:

$$B = \frac{B_i V_i + (F_{B2} B2 - B_i F_B)(t_{i+1} - t_i)}{V_{i+1}},$$

where B is the instantaneous concentration of anions being fed into the reactor, $B_i$ is the anion concentration at time $t_i$ that exists in the first container, $V_i$ is the volume of solution at time $t_i$ that exists in the first container, $F_{B2}$ is the flowrate from the third container into the first container, B2 is the anion concentration in the third container, $F_B$ is the flowrate from the first container into the reactor, $t_{i+1}$ is time at moment i+1, $t_i$ is time at moment i, $V_{i+1}$ is the volume of solution at time $t_{i+1}$ that exists in the first container.

In one embodiment, before the first time $t_1$, the first anion composition $B_1$ is fed uniformly, after the first time $t_1$, the first anion composition $B_1$ is gradually altered to the second anion composition $B_2$ at the second time $t_2$.

In one embodiment, the first time $t_1$ is greater than 50% of the whole reaction time. In another embodiment, the first time $t_1$ is greater than 75% of the whole reaction time.

In one embodiment, the time period from the initial time $t_0$ to the first time $t_i$ is greater than 50% of the whole reaction time. In another embodiment, the time period from the initial time $t_0$ to the first time $t_i$ is greater than 75% of the whole reaction time.

In one embodiment, the flowrate or concentration of stream (b) are constant during the co-precipitation reaction before the first time $t_1$. In another embodiment, the flowrate or concentration of stream (b) is gradually changed during the reaction. In still another embodiment, the flowrate and the concentration begin to change from the first time $t_1$ when the first anion composition $B_1$ is gradually changed to the second anion composition $B_2$.

In the embodiment of FIG. 3, during the precipitation of $A_1$ from the initial time $t_0$ to the first time $t_1$, the step of feeding the stream (a) includes the following step: feeding the first cation composition $A_1$ through the second container to the reactor from the initial time $t_0$ to the first time $t_1$, during which the first cation composition $A_1$ is also filled into the second container, which makes the second container in a state full of the first cation composition $A_1$ at the first time $t_1$. Because of this, the core is formed to have the first cation composition $A_1$ as the only cation with uniform concentration.

During the co-precipitation of $A_1$ and $A_2$ from the first time $t_1$ to the second time $t_2$, in which at the first time $t_1$, the second container is filled with the first cation composition $A_1$, the second container is connected with the reactor; the step that the first cation composition $A_1$ is gradually switched to the second cation composition $A_2$ from the first time $t_1$ to the second time $t_2$ includes the following steps: feeding the second cation composition $A_2$ from a fourth container into the second container with a certain flowrate from the first time $t_1$ to the second time $t_2$, the first cation composition $A_1$ and the second cation composition $A_2$ form a dynamic mixture in the second container; and feeding the dynamic mixture into the reactor through the second container from the first time $t_1$ to the second time $t_2$, wherein at the first time $t_1$, the dynamic mixture fed into the reactor is mainly the first cation composition $A_1$, while at the second time $t_2$, the dynamic mixture is mainly the second cation composition $A_2$.

In the embodiment of FIG. 4, during the precipitation of $A_1$ from the initial time $t_0$ to the switching time $t_s$, the step of feeding the stream (a) includes the following step: feeding the first cation composition $A_1$ through the second container to the reactor from the initial time $t_0$ to the switching time $t_s$, during which the first cation composition $A_1$ is also filled into the second container, which makes the second container in a state full of the first cation composition $A_1$ at the switching time $t_s$.

During the co-precipitation of $A_1$ and $A_2$ from the switching time $t_s$ to the second time $t_2$, in which at the switching time $t_s$, the second container is filled with the first cation composition $A_1$, the second container is connected with the reactor; the step that the first cation composition $A_1$ is gradually switched to the second cation composition $A_2$ from the switching time $t_s$ to the second time $t_2$ includes the following steps: feeding the second cation composition $A_2$ from the fourth container into the second container with certain flowrate from the switching time $t_s$ to the second time $t_2$, the first cation composition $A_1$ and the second cation composition $A_2$ form a dynamic mixture in the second container; and feeding the dynamic mixture into the reactor through the second container from the switching time $t_s$ to the second time $t_2$, wherein at the switching time $t_s$, the dynamic mixture fed into the reactor is mainly the first cation composition $A_1$, while at the second time $t_2$, the dynamic mixture is mainly the second cation composition $A_2$.

In the embodiment of FIG. 2, the first cation composition $A_1$ is fed from the initial time $t_0$ to the second time $t_2$. In the embodiment of FIG. 5, the first cation composition $A_1$ is fed from the initial time $t_0$ to the third time $t_3$.

In the embodiments of the present disclosure, the first cation composition $A_1$ and the second cation composition $A_2$ has a cation ratio of $Ni_xMn_yCo_zMe_{1-x-y-z}$, where $x+y+z \geq 0.9$, $z \leq 0.2$, and "Me" refers to one or more additional metal elements selected from the group consisting of Mg, Ca, Zr, Ti, V, Cr, Fe, Cu and Al. In one embodiment, $z < 0.05$. In another embodiment, z=0. In another embodiment, "Me" is Al, Mg, Zr, Ti or some combination of the species listed above.

Please note that in the particle precursor product, the "first anion composition $B_1$", "second anion composition $B_2$" and "third anion composition $B_3$" refers to the anion precipitated therein. Meanwhile, the "first anion composition $B_1$", "second anion composition $B_2$" and "third anion composition $B_3$" in the method refers to the salts containing the anions mentioned.

The present disclosure further provides a method for preparing cathode active particles, which includes the steps below: after yielding the particle precursors above, mixing the particle precursors with a lithium source to form a mixture, and calcining the mixture to yield cathode active particles. During such calcination, lithiation reaction occurred and water removed from the mixture.

Generally, each precipitation zone volume is defined as the volume of a single mixed vessel or the sum of several processing vessels, pumps, or solid-liquid thickening devices connected in parallel.

The precipitation zone can generally be described by the following mass balance equation:

$$\frac{d(\rho_c V)}{dt} = \Sigma_{\alpha=a}^{z} F_\alpha \rho_\alpha,$$

where "$\alpha$" represents for the inlet/outlet streams (a) to (z), "$\rho_\alpha$" represents for a fluid density, "V" refers to a volume of the precipitation zone, "$F_\alpha$" refers to a flowrate of the volumetric, "$\rho_\alpha$" is a density of inlet streams; "$\rho_c$" is a density of accumulating fluid in the reactor which changes with time.

In one embodiment, only one precipitation zone is used, and the co-precipitation reactions occur during batch operation, the mass balance equation is defined as $d(\rho_c V)/dt \neq 0$.

In another embodiment, multiple precipitation zones are linked in series, $d(\rho_c V)/dt \neq 0$. In still another embodiment, multiple precipitation zones are linked in series, $d(\rho c V)/dt = 0$.

In the present disclosure, the cathode active particles are core-shell structured particle precursor produced by a co-precipitation reaction, size of the cathode active particles is proportional to the reaction time, and the composition deposited onto a particle at a particular time is directly related to the inlet ion compositions.

As shown in FIG. 2, the particle precursor has a core-shell structure, from the initial time $t_0$ to the first time $t_1$, the first anion composition $B_1$ and the first cation composition $A_1$ are fed into the reactor. Because of this, the core is made of the precipitations formed by the first anion composition $B_1$ and the first cation composition $A_1$. From the first time $t_1$ to the second time $t_2$, the first anion composition $B_1$ is gradually changed to the second anion composition $B_2$, and the first cation composition $A_1$ is still fed into the reactor at a constant flowrate or concentration. In this embodiment, the shell is made of precipitations formed by the first anion composition $B_1$, the second anion composition $B_2$ and the first cation composition $A_1$, in which the first anion composition $B_1$ is gradually switched to the second anion composition $B_2$, while the first cation composition $A_1$ is constant.

As shown in FIG. 3, the particle precursor includes a core-shell structure. In such embodiment, from the initial time $t_0$ to the first time $t_1$, only the first cation composition $A_1$ and the first anion composition $B_1$ are fed into the reactor. From the first time $t_1$ to the second time $t_2$, the first cation composition $A_1$ is gradually changed to the second cation composition $A_2$, and the first anion composition $B_1$ is gradually changed to the second anion composition $B_2$. In this embodiment, the shell is formed by co-precipitation particles which includes the first anion composition $B_1$ and the second anion composition $B_2$, and the first cation composition $A_1$ and the second cation composition $A_2$, in which the first anion composition $B_1$ is gradually changed to the second anion composition $B_2$, while the first cation composition $A_1$ is gradually changed to the second cation composition $A_2$; the core is formed by precipitation particles which includes the first anion composition $B_1$ and the first cation composition $A_1$.

In still another embodiment, as shown in FIG. 4, the stream (a) has the first cation composition $A_1$ and the second cation composition $A_2$. From the initial time $t_0$ to the switching time $t_s$, the first cation composition $A_1$ is constant, while from the switching time $t_s$ to the second time $t_2$, the first cation composition $A_1$ is gradually changed to the second cation composition $A_2$. Meanwhile, from the initial time $t_0$ to the first time $t_1$, the first anion composition $B_1$ is constant; from the first time $t_1$ to the second time $t_2$, the first anion composition $B_1$ is gradually changed to the second anion composition $B_2$. Because of this, at the time period from the first time $t_1$ to the switching time $t_s$, the shell includes an intermediate part which is formed by precipitation particles formed by anions of the first anion composition $B_1$ and the second anion composition $B_2$, and cations of the first cation composition $A_1$.

In this embodiment, the core is formed to have only the first cation composition $A_1$ and the first anion composition $B_1$ with constant concentration. Within the shell, it includes the first anion composition $B_1$ and the second anion composition $B_2$, in which the first anion composition $B_1$ is gradually changed to the second anion composition $B_2$. Further, the shell is divided to an intermediate part and a gradient part based on the cations. The intermediate part is formed by co-precipitation particles which include the first cation composition $A_1$; the gradient part is formed by co-precipitation particles which include the first cation composition $A_1$ and the second cation composition $A_2$, in which the first cation composition $A_1$ is gradually changed to the second cation composition $A_2$.

In yet another embodiment, as shown in FIG. 5, different from that in FIG. 2, the particle precursor further includes a periphery part enwrapping the shell. The periphery part is made of precipitations of the second anion composition $B_2$ and the first cation composition $A_1$.

In view of the above, in one embodiment, the cation composition changes from the first composition $A_1$ to the second composition $A_2$ gradually as a gradient with time. In another embodiment, the cation composition changes from the first composition $A_1$ to the second composition $A_2$ abruptly, as a core-shell interface. The second time when $A_1$ switches to $A_2$ can occur at any moment. In one embodiment, the time when the cation composition switches from the first composition $A_1$ to the second composition $A_2$ does not coincide with the time when the anion composition changes from $B_1$ to $B_2$.

In one embodiment, $A_1 = A_2$. In such embodiment, there is only one cation composition species in stream (a) fed into the reactor from the beginning to the end. For example, in one embodiment, as shown in FIGS. 2 and 5.

In another embodiment, as shown in FIG. 3, the cation composition changes from the first composition $A_1$ to the second composition $A_2$ for feeding different transitional-metal combinations will start at the same time period when the anion composition changes from the first composition $B_1$ to the second composition $B_2$ for feeding different anions deposited into the active particles, i.e., from the first time $t_1$ to the second time $t_2$. In this embodiment, since the cation composition and the anion composition change at the same time, the deposited active particles will have a core-shell structure, the core of the particle includes the first cation composition $A_1$ and the first anion composition $B_1$, and the shell of the particle enwraps around the core and includes the first cation composition $A_1$ and the second cation composition $A_2$, and the first anion composition $B_1$ and the second anion composition $B_2$, wherein the first cation composition $A_1$ is gradually changed to the second cation composition $B_2$, and the first anion composition $B_1$ is gradually changed to the second anion composition $B_2$. FIG. 3 shows a schematic view of the particle precursor where the first cation $A_1$ and the first anion $B_1$ is in the core, and the first cation $A_1$ and second cation $A_2$, and the first anion $B_1$ and second anion $B_2$ is in the shell.

Further, either of the first cation composition $A_1$ and the second cation composition $A_2$ has a cation ratio of $Ni_xMn_yCo_zMe_{1-x-y-z}$, where $x+y+z\geq0.9$, $z\leq0.2$, and "Me" refers to one or more additional metal elements selected from the group consisting of Mg, Ca, Zr, Ti, V, Cr, Fe, Cu and Al. In one embodiment, $z<0.05$. In another embodiment, $z=0$. In another embodiment, "Me" is Al, Mg, Zr, Ti or some combination of the species listed above.

Under the feed conditions discussed above, a precipitated particle slurry will be collected after the co-precipitation is finished, after being treated, the particle slurry is treated to yield the particle precursor. The particle precursor is expressed as $(Ni_xMn_yCo_zMe_{1-x-y-z})(CO_3)_a(OH)_{2-2a}$ where $x+y+z\geq0.9$, $z\leq0.2$, $0\leq a\leq1$, "Me" is additional metal elements except Ni, Mn and Co, such as Mg, Ca, Zr, Ti, V, Cr, Fe, Cu and Al.

In some embodiments, the first cation composition $A_1$ and the second cation composition $A_2$ are different. In such embodiments, the first cation composition $A_1$ has a cation ratio of $Ni_xMn_yCo_zMe_{1-x-y-z}$, where $x+y+z\geq0.9$, $0.75\leq x\leq1$; $0\leq z\leq0.1$, "Me" refers to one or more additional metal elements selected from the group consisting of Mg, Ca, Zr, Ti, V, Cr, Fe, Cu and Al. The second cation composition $A_2$ has a cation ratio of $Ni_xMn_yCo_zMe_{1-x-y-z}$ where $x+y+z\geq0.9$, $0.3\leq x\leq0.7$; $0.25\leq y\leq0.5$, "Me" refers to one or more additional metal elements selected from the group consisting of Mg, Ca, Zr, Ti, V, Cr, Fe, Cu and Al.

In one embodiment, by changing the composition of stream (a), cation composition would be changed continuously for all or part of the material, thus forming a cathode whose cation is made of concentration gradient transitional-metals. In one embodiment, the transitional-metals, i.e., the cations, change during the whole process for preparing the entire particle. In another embodiment, only a portion of the particle make linear gradient shell transitional-metal particles with a core-shell anion species, others remain same. In still another embodiment, only a portion of the particle make non-linear gradient shell transitional-metal particles with a core-shell anion species. In yet another embodiment, only a portion of the particle make multi-slope gradient shell transitional-metal particles with a core-shell anion species. In still another embodiment, only a portion of the particle make core-gradient shell transitional-metal particles with a core-shell anion species. In yet another embodiment, only a portion of the particle make core-gradient-shell transition metal particles with a core-shell anion species.

In some embodiments, to obtain the gradient part of the shell, the transitional-metal feed, i.e., the stream (a) which provides the first cation composition $A_1$ and the second cation composition $A_2$ has a cation ratio of $Ni_xMn_yCo_zMe_{1-x-y-z}$, where $x+y+z\geq0.9$, $z\leq0.2$, "Me" refers to one or more additional metal elements selected from the group consisting of Mg, Ca, Zr, Ti, V, Cr, Fe, Cu and Al, the first cation composition $A_1$ is selected from $0.85\leq x\leq1$; $0\leq z\leq0.1$, the second cation composition $A_2$ is selected from $0.4\leq x\leq0.7$; $0.25\leq y\leq0.5$.

In one embodiment, the start of gradient part in shell, or the change in slope for multi-slope cathode particles can occur at any time during the particle process.

In one embodiment, as shown in FIG. 4, the time when the first cation composition $A_1$ starts to gradually be switching to the second cation composition $A_2$ does not coincide with the time when the first anion composition $B_1$ starts to gradually be switching to the second anion composition $B_2$. FIG. 4 shows a particle precursor which is produced by a method wherein the first anion composition $B_1$ starts to be switched to the second anion composition $B_2$ at a time different from that when the first cation composition $A_1$ starts to be switched to the second cation composition $A_2$. Hence, for the anions and the cations, the interface of the anions $B_1$ and $B_2$ does not coincide with the interface of the cations $A_1$ and $A_2$.

In another embodiment, as shown in FIG. 2, for the anions $B_1$ and $B_2$, since $B_1$ starts to be switched to $B_2$ from the first time $t_1$, and therefore forms a shell which contains $B_1$ and $B_2$ with gradual concentration, hence, there is a clear interface formed at the first time $t_1$ in the particle. For the cations, since there is only one cation $A_1$ fed into the reactor during the whole process, there is no clear interface of $A_1$ in the particle.

In one embodiment, the gradient part in the shell initiates when $B_1$ starts to be switched to $B_2$. In another embodiment, the slope change for multi-slope gradient particles undergoes the change when $B_1$ equals $B_2$.

The stream $(e_i \ldots z_i)$ includes additional solvents, surface acting agents or de-foaming agents. For example, the solvent is at least one selected from ethanol, isopropanol, ionic liquids and so on. The surface acting agents may be alkyl sulfates such as sodium dodecyl sulfate (SDS), alkyl trimethyl ammonia species such as cetyltrimethyl ammonia (CTAB), glycols, glycerides. The de-foaming agent is ethanol.

In one embodiment, dopant is also fed into the reactor. The dopant refers to salts of metal elements other than Ni, Co and Mn, labeled as "Me". In one embodiment, the dopant species is $Al_2(SO_4)_3$. As a dopant element, $Al^{3+}$ would be precipitated together with other cations. In such embodiment, $Al^{3+}$ can be added to the cathode particle precursor during co-precipitation without using an additional chelating additive to slow the precipitation kinetics. Further, in such embodiment, the cathode particle precursor is Ni-rich material in which a ratio between Ni and transitional metal is larger than 0.7, and still includes the Al dopant without using an organic chelating additive. The thickness and depth of $Al^{3+}$ depositing into the particle precursor can be tailored and regulated based on the time when the anions start to be gradually switched and the time when feeding $Al^{3+}$ thereinto.

Solids with different cation-anion pairings have different equilibrium solubilities, as is tested by the solubility product, Ksp. During precipitation the Ksp value is the thermodynamic limit of metal ions precipitating out of solution, with different anions and pH having an influence. By adjusting the solution pH and anion, the precipitations possible and the stability of said cations in the solid form is adjusted, which is desirable for cathode precursor particles to better control the selection of dopants available for use during a co-precipitation reaction.

The pH of each precipitation zone is maintained at a range of 7-13. In one embodiment, the pH is at a range of 9.5-12.5 when precipitating hydroxides and at a range of 7-10 when precipitating carbonates.

In one embodiment, the pH is constant regardless of the anion species being fed for the co-precipitation. In another embodiment, the pH starts to be changed at the time when the first anion composition $B_1$ starts to be gradually switched to the second anion composition $B_2$.

The precipitation zone agitated vessel is well mixed during the feeding, and has a Re>6,400, with a mixing time from 0 to 1,200 seconds. In one embodiment, the mixing time is 0 to 120 seconds. In another embodiment, the mixing time is 0 to 45 seconds. The precipitation zone temperature is maintained between 30 and 80° C. In one embodiment, the precipitation zone temperature is maintained between 45 and 60° C.

Table 1 shows the solubility product constant ($K_{sp}$) of carbonate and hydroxide materials. As can be seen from table 1 that the solubility product constant ($K_{sp}$) of carbonate is larger than that of hydroxide. Theoretically, more hydroxide materials precipitate than the carbonate materials under the same pH. The $K_{sp}$ and pH are usually two main factors determining the solubility of a substance. In table 1, "(II)" means a valence of the metal element in the precipitation is divalent.

And then, the precipitated particles are dried under vacuum at an atmosphere of $N_2$, Ar or air for 3-24 hours between 80-200° C., thus forming the precipitated particles precursor.

Once dried, the precipitated particles precursor is contacted and well mixed with a lithium source to form a mixture. The lithium source is selected from lithium hydroxide (i.e., LiOH), LiOH·$H_2O$, lithium carbonate ($Li_2CO_3$), $LiNO_3$, lithium acetate, lithium metal or $Li_2O$. In one embodiment, the lithium source is lithium hydroxide. In another embodiment, the lithium source is lithium carbonate.

In one embodiment, a mole ratio between Li from the lithium source and the metal cation from stream (a) is in a range of 0.5-1.5. In another embodiment, the mole ratio is 0.9-1.15. In still another embodiment, the mole ratio is 1.01-1.10.

After the lithium source and the precipitated particles precursor are mixed uniformly to form a mixture, calcine the mixture under a temperature of 300-950° C., wherein multiple hold temperatures and ramp rates may be used. For example, firstly controlling the temperature at 300-500° C. for 2-20 hours, and then raising temperature to 700-850° C. and maintaining for 2-20 hours. The ramp rate during heating is from 0.5 to 10 degrees per minute. In another embodiment, the ramp rate during heating is 2-5 degrees per minute. The calcination time is from 2 hours to 48 hours.

TABLE 1

Solubility Product Constants near 25° C.

| Ionic Compound | $K_{sp}$ | Ionic Compound | $K_{sp}$ |
|---|---|---|---|
| Aluminum hydroxide | $1.3 \times 10^{-33}$ | Aluminum carbonate (not stable) | N/A |
| Cobalt(II) hydroxide | $1.6 \times 10^{-15}$ | Cobalt(II) carbonate | $1.4 \times 10^{-13}$ |
| Magnesium hydroxide | $1.8 \times 10^{-11}$ | Magnesium carbonate | $3.5 \times 10^{-8}$ |
| Manganese(II) hydroxide | $1.9 \times 10^{-13}$ | Manganese(II) carbonate | $1.8 \times 10^{-11}$ |
| Nickel(II) hydroxide | $2.0 \times 10^{-15}$ | Nickel(II) carbonate | $6.6 \times 10^{-9}$ |

In another embodiment, the pH is constant regardless of the anion species being fed for the co-precipitation. In such embodiment, both the first anion composition $B_1$ and the second anion composition $B_2$ have a constant and same pH, for example, at a range of 9-10.5.

In some embodiments, the pH changes during the time period that the anion composition switches from $B_1$ to $B_2$. For example, the pH changes during the time period when hydroxide is switched to carbonate, since the first anion composition $B_1$ is hydroxide which has a pH of 10-14, and the second anion composition $B_2$ is carbonate which has a pH much lower.

In some embodiments, the pH gradually changes during the entire reaction, or for a specified duration of the reaction.

After sufficient time till the precipitation ends, the precipitation particles are deposited from the precipitation zone to from a particle slurry, which is collected in a hold-up tank or directly fed to a solid-liquid filtration device to obtain precipitated particles. The filtration device may be a plate and frame filter, candlestick filter, centrifuge, vacuum drum filter, pressure drum filter, hydrocyclone, nutsche filter, clarifier or some combination of devices. Next, the filtered precipitated particles (i.e., the filter cake) are washed to remove byproduct salts from the precipitation reactions.

During calcination in the method above, water may generate between 0-800° C. during the calcining step. Since during calcination, the precursors underwent decomposition and/or oxidation to yield the expected products, the cathode active particles. During the calcining step, the following reaction occurred based on formulas 1-3, wherein $M(OH)_2$, $M(CO_3)$ and $M(C_2O_4)$ may be one of the precipitated particles from the solution, M refers to metals:

$$M(OH)_2 = MO_x + H_2O \quad \text{(formula 1)}$$

$$M(CO_3) = MO_x + CO/CO_2 \quad \text{(formula 2)}$$

$$M(C_2O_4) = MO_x + CO/CO_2 \quad \text{(formula 3)}.$$

Tables 2 and 3 show moles of water evolved from calcination of 1 mol of $M(OH)_2/MCO_3$ precursor (i.e., lithiation process) when using different lithium source. We can get that while the exact water release is complicated by the choice of lithium source, it is apparent that hydroxide precursor particles will generate water while carbonate and oxalate anion presence will result in some carbon-oxide species.

TABLE 2

Moles of water evolved from calcination of 1 mol M(OH)$_2$/MCO$_3$
precursor when the lithium source is LiOH•H$_2$O

| 1 mol precursor lithiation | M(OH)$_2$ | MCO$_3$ | M(OH)$_2$/MCO$_3$ (1:1) | M(OH)$_2$/MCO$_3$ (1:1) | M(OH)$_2$/MCO$_3$ (1:1) | M(OH)$_2$/MCO$_3$ (1:1) |
|---|---|---|---|---|---|---|
| | | | Water evolved from calcination (mol) | | | |
| 90% | 2.25 mol | 1.35 mol | 1.80 mol | 1.95 mol | 2.03 mol | 2.07 mol |
| 100% | 2.50 mol | 1.50 mol | 2.00 mol | 2.17 mol | 2.25 mol | 2.30 mol |
| 103% | 2.58 mol | 1.55 mol | 2.06 mol | 2.23 mol | 2.32 mol | 2.37 mol |
| 110% | 2.75 mol | 1.65 mol | 2.20 mol | 2.38 mol | 2.48 mol | 2.53 mol |
| 120% | 3.00 mol | 1.80 mol | 2.40 mol | 2.60 mol | 2.70 mol | 2.76 mol |
| 130% | 3.25 mol | 1.95 mol | 2.60 mol | 2.82 mol | 2.93 mol | 2.99 mol |

TABLE 3

Moles of water evolved from calcination of 1 mol M(OH)$_2$/MCO$_3$
precursor when the lithium source is Li$_2$CO$_3$

| 1 mol precursor lithiation | M(OH)$_2$ | MCO$_3$ | M(OH)$_2$/MCO$_3$ (1:1) | M(OH)$_2$/MCO$_3$ (1:1) | M(OH)$_2$/MCO$_3$ (1:1) | M(OH)$_2$/MCO$_3$ (1:1) |
|---|---|---|---|---|---|---|
| | | | Water evolved from calcination (mol) | | | |
| 90% | 0.90 mol | 0.00 mol | 0.45 mol | 0.60 mol | 0.68 mol | 0.72 mol |
| 100% | 1.00 mol | 0.00 mol | 0.50 mol | 0.67 mol | 0.75 mol | 0.80 mol |
| 103% | 1.03 mol | 0.00 mol | 0.52 mol | 0.69 mol | 0.77 mol | 0.82 mol |
| 110% | 1.10 mol | 0.00 mol | 0.55 mol | 0.73 mol | 0.83 mol | 0.88 mol |
| 120% | 1.20 mol | 0.00 mol | 0.60 mol | 0.80 mol | 0.90 mol | 0.96 mol |
| 130% | 1.30 mol | 0.00 mol | 0.65 mol | 0.87 mol | 0.98 mol | 1.04 mol |

The content of water evolved from the cathode particle precursor and Li precursor will be decreased when an anion composition gradient material is prepared, because CO/CO$_2$ will be evolved partially during the decomposition reactions instead of H$_2$O, just as formulas 2 and 3 show.

The calcination is conducted under atmosphere selected from N$_2$, air, dried air, oxygen or some combination thereof. The calcination temperature is critical for concentration gradient materials, since too high, too long, or a combo of the two may cause so much cation diffusion that a gradient is no longer present in the final cathode active particles.

To characterize and analysis the precipitated cathode active particles which have concentration gradient elements, SEM, porosimetry, pycnometer and particle size distributions can be utilized. The presence of a concentration gradient can be confirmed by depth profiling a particle or via cross-sectioning a particle and using an EDS line scan or electron microprobe analyzer.

The precipitated and cathode active particles can be characterized using the particle size distribution D10, D50, D90 or the Sauter mean diameter $d_{32}$. The Sauter mean diameter $d_{32}$ can be calculated by the formula $$d_{32} = \frac{\sum_{k=1}^{N} n_k d_k^3}{\sum_{k=1}^{N} n_k d_k^2},$$

wherein "$n_k$" is the relative fraction and "$d_k$" is the bin diameter from the particle size distribution. The particle size distribution can be collected via a light scattering instrument. In one embodiment, the prepared cathode active particles have a Sauter mean diameter at a range of 0.5-30 μm. In another embodiment, the Sauter mean diameter is at a range of 1-15 μm.

The porosity of the prepared cathode active particles can be analyzed using BET and BJH analysis.

The prepared cathode active particles can be used in lithium-ion battery, in which the prepared cathode active particles include Li and transitional metals. In detail, in one embodiment, the prepared cathode active particles are mixed with a binder and conductive particles to form a mixture slurry. The mixture slurry is further cast onto a metallic foil to form a cathode electrode. The cathode electrode can be used in a lithium-ion battery.

To test the cathode material performance, galvanotactic charge-discharge tests can be performed. The material capacity, cycle retention, rate performance and cycle efficiency can all then be determined.

Example 1

FIG. 1 shows a schematic view of the reaction device to form the cathode active particles. As shown in FIG. 1, the reaction is conducted with the following steps: Firstly, placing a 10 L glass reactor into a jacketed stirred tank, filling the glass reactor with 3 L of 0.5M aqua ammonia and stirred at 500 rpm. At the same time sparging N$_2$ gas through the solution to remove oxygen from the water and headspace of the reactor, and controlling the temperature of the solution to 50° C. via circulating hot water through the jacket. Meanwhile, in order to control the pH of the solution, feeding a 10.6M NaOH solution with a pH controller at set-point 10.7.

And then, pumping a 2M 90:10 Ni:Co metal sulfate solution (the first cation composition A$_1$) into the reactor at a flowrate of 125 mL/hr and a 9.6M aqua ammonia solution at a flowrate of 20 ml/hr. Proceeding the feeding for 21.3 hrs, and then ceasing the metal sulfate and aqua ammonia feeds. Particle slurry was formed in the reactor.

Optionally, filtering to remove the liquids and washing the particle slurry using a Buchner funnel until the filtrate conductivity was below 100 mS, at which point the wet Ni:Co 90:10 filter cake was placed into a container with a constant $N_2$ cover. Such step would facilitate the hydroxide anion to grow directly in the core. Next, feeding 3 L of 0.2M aqua ammonia solution into another 10 L glass reactor, sparging with $N_2$ gas into the solution to remove oxygen therein. And then, adding 19 wt % of the collected Ni:Co 90:10 filter cake to the solution. Heating the solution to 50° C. while stirring at 500 rpm. These steps are optional.

And then, pumping a 2M Ni:Mn:Co 6:2:2 metal sulfate solution into the reactor at a flowrate of 125 mL/hr for the first 3.2 hrs. Concurrently pumping a 1.5M sodium carbonate solution, the feeding of the sodium carbonate starting with 400 mL of liquid at 0.5 mL/min into a tank originally containing 400 mL of 3M sodium hydroxide. Pumping The tank originally containing sodium hydroxide was pumped into the reactor continuously at 1 mL/min. Separately, the 3M NaOH solution was controlled by a metering pump to maintain the reactor pH. The reactor pH set-point started at 9 and was decreased by 0.2 every hour.

At 3.2 hours, the pH control solution was switched from 3M sodium hydroxide to 1.5M sodium carbonate, and 0.64 mol of aluminum sulfate powder was added to the transition metal sulfate Ni:Mn:Co 6:2:2 solution. All other flows remained the same into the reactor. At 6.4 hrs, the flows and stirring for the reactor were stopped. The particle slurry was filtered and washed. The filter cake was dried at 100° C. under nitrogen overnight before being characterized.

In order to make the feeding clearer, table 4 lists partial materials added in partial stage and their relevant information provided by the method of example 1.

TABLE 4 partial materials and relevant information in example 1

| | concentration | flowrate | time | amount |
|---|---|---|---|---|
| Materials added | | | | |
| Ni:Mn:Co 6:2:2 | 2M | 125 mL/hr | 3.2 hrs | / |
| Sodium carbonate | 1.5M | 0.5 mL/min | / | 400 mL |
| NaOH | 10.6M | 1 mL/min | / | / |
| NaOH (pH controller) | 3M | / | / | / |
| Materials added 3.2 hrs later | | | | |
| Ni:Mn:Co 6:2:2 | 2M | 125 mL/hr | 3.2 hrs | / |
| Sodium carbonate | 1.5M | 0.5 mL/min | / | 400 mL |
| NaOH | 10.6M | 1 mL/min | / | / |
| Sodium carbonate (pH controller) | 1.5M | / | / | / |
| Aluminum sulfate (dopant) | 0.64 mol | / | / | / |

Figure 6:
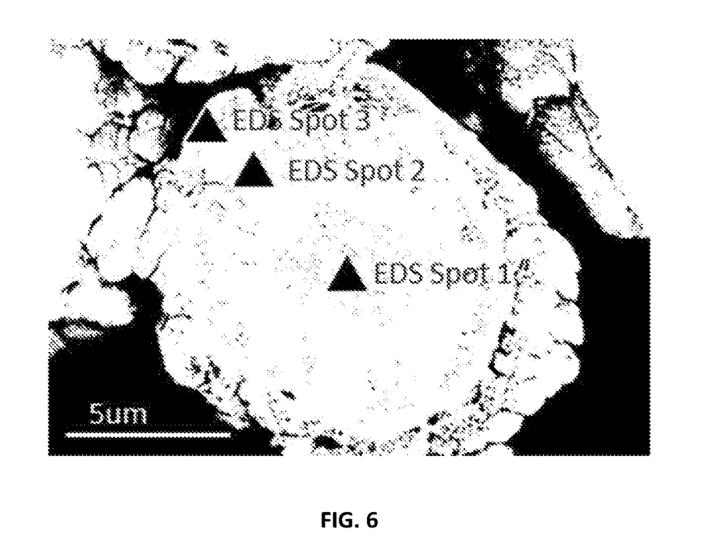
FIG. 6 shows SEM image of cross-sectional particle precursors of Embodiment 1.
Figure 7:
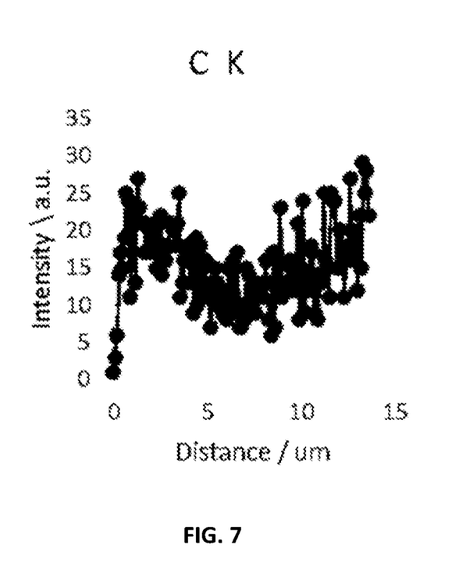
FIG. 7 shows carbon intensity derived from the SEM image of cross-sectional particle precursors of Embodiment 1.

To verify the particle structure, a Hitachi SU8010 SEM that is able to use a focused ion beam to cross-sectional particles was used to study the particle structure. After cross section, EDS was used to determine the relative locations of elements within the sample particles studied. FIG. 6 shows the spots on the cross section of one particle precursor for ED observation, wherein triangles indicates the locations of EDS data collection region. Table 5 shows the elemental analysis results on cross-sectional particle precursor in example 1. FIG. 7 shows carbon signature of EDS line scan of the cross-sectional particle precursor of Example 1, wherein carbon is derived from a component of the sodium carbonate anion. In FIG. 7, the character "C" means carbon, and "K" after "C" is an alpha radiation signature.

TABLE 5

Results of EDS elemental analysis on precursor particle of Example 1

| EDS Spot | EDS Spot 1 | | EDS Spot 2 | | EDS Spot 3 | |
|---|---|---|---|---|---|---|
| Element | Weight % | Atomic % | Weight % | Atomic % | Weight % | Atomic % |
| C | 3.48 | 8.60 | 3.79 | 8.72 | 6.67 | 15.13 |
| O | 31.44 | 58.27 | 34.69 | 59.95 | 30.11 | 51.28 |
| Al | 0.37 | 0.41 | 3.81 | 3.91 | 7.08 | 7.15 |
| Mn | 1.81 | 0.98 | 8.55 | 4.30 | 12.57 | 6.23 |
| Co | 6.28 | 3.16 | 12.53 | 5.88 | 11.80 | 5.46 |
| Ni | 56.61 | 28.59 | 36.62 | 17.25 | 31.77 | 14.75 |

From table 5 we can get that the Al content increases near the surface. Meanwhile, table 5 also shows that the carbon content increase near the surface. FIG. 7 shows a carbon signature of EDS line scan of cross-sectional particle precursor of example 1. As shown in FIG. 7, the carbon signature is strongest at the location where the distance of 15, and at the distances around 8-15 the carbon signature gradually becomes stronger. Since carbon is derived from sodium carbonate solution, the data in table 5 and FIG. 7 is consistent with the steps for forming the particle with a concentration gradient within the particle.

In view of the above, the method of the present disclosure has the following advantages:

Firstly, since different cations can be precipitated with different anions separately, the transition metal dopants other than Ni, Co and Mn cations that are incompatible with the core anion species under the processing conditions can be easily added to the particle precursor in the shell. And vice versa, wherein cations or other dopants that can only be compatible with the core anion under the processing conditions can be added to the particle before switching to an incompatible processing location for the shell. Particularly, $Al^{3+}$ can be added to the particle precursor during the co-precipitation under the premise that there is hydroxide in the solution which can form precipitation with $Al^{3+}$; in such conditions, no additional organic chelating additives are needed to remove $Al^{3+}$, and the precipitation kinetics are avoided to be slowed without chelating agents. Because of this, Ni-rich particles precursor can have Al dopant into the particle without using organic chelating additives, the Ni-rich particles precursor has a mole ratio of Ni to transitional metals higher than 0.7. The concentration of $Al^{3+}$ deposited into the particles can be adjusted based on the time feeding the $Al^{3+}$ dopants and the time when switching the anions.

Secondly, no matter where the gradient portion is located, in the core or in the shell, the concentration gradient of the anion species ensures that there is smooth transition between different anion species, that is, the transition from the former anion to the latter is not a sharp change, but a gradual switching. Because of this, the gradient portion endows the particle precursor a gradient surface, which makes the transition from the portion having only the first anion to the portion having both the first and second anions becomes more smoothly. The particle precursor is more solid during later processing, and cracks or delamination would not occur. This has great improved the duration and life-span of the cathode particles prepared based on the particle precursor.

Thirdly, due to the feeding of elements Ni, Mn, Al etc. into the reaction, the cobalt content will be below 20% of the total transition metal ratio, and preferably below 5%, and more preferably 0% cobalt will be present in the cathode precursor particle. Because of this, the cost is greatly decreased.

Fourthly, during calcination, anions of $CO_3$ or $C_2O_4$ would evolve $CO/CO_2$ gas, which makes non-homogeneous porosity within the particles. Since the concentration of the anions are gradually changed, the porosity within the particles would also be gradually increased, especially near the surface of the particles. Hence, the material may have improved transport properties during high rate electrochemical testing.

Fifthly, the content of water evolved from the cathode particle precursor and Li source will be decreased when an anion composition gradient material is prepared, because $CO/CO_2$ will be evolved partially instead of $H_2O$ during the decomposition reactions.

INDUSTRIAL APPLICABILITY

The method of the present disclosure can prepare transitional-metal particle precursor and cathode active particles under co-precipitation reaction. The particle precursor has a core-shell structure, the core and the shell are made of different anions. Such cathode active particle can be used to prepare cathode of lithium-ion battery.

What is claimed is:

1. A method for preparing a core-shell structured particle precursor, comprising the following steps:

from an initial time $t_0$ to a first time $t_1$, feeding a first anion composition $B_1$ through a first container into a reactor, and feeding a first cation composition $A_1$ through a second container into the reactor, the first anion composition $B_1$ and the first cation composition $A_1$ reacting and precipitating in the reactor, $t_1$ comes after to, $t_0=0$;

at the first time $t_1$, the first container is full of the first anion composition $B_1$, and the second container is full of the first cation composition $A_1$;

feeding a second anion composition $B_2$ through a third container into the first container and feeding the second anion composition $B_2$ and the first anion composition $B_1$ through the first container into the reactor from the first time $t_1$ to a second time $t_2$, $t_2$ comes after $t_1$, during which the first anion composition $B_1$ is gradually switched to the second anion composition $B_2$ wherein the first anion composition $B_1$ is hydroxide salts, and the second anion composition $B_2$ is at leaset one selected from the group consisting of carbonate, oxalate, or a comination thereof; and feeding at least the first cation composition $A_1$ through the second container into the reactor from the first time $t_1$ to the second time $t_2$, thereby forming a precipitated particle slurry; and filtering, and drying the precipitated particle slurry to yield the particle precursor;

wherein instantaneous concentration of anions being fed into the reactor from the first time $t_1$ to the second time $t_2$ can be described as:

$$B = \frac{B_i V_i + (F_{B2} B2 - B_i F_B)(t_{i+1} - t_i)}{V_{i+1}},$$

wherein:
B is the instantaneous concentration of anions being fed into the reactor;
$B_i$ is the anion concentration at time $t_i$ that exists in the first container;
$V_i$ is the volume of solution at time $t_i$ that exists in the first container;
$F_{B2}$ is the flowrate from the third container into the first container;
B2 is the anion concentration in the third container;
$F_B$ is the flowrate from the first container into the reactor;
$t_{i+1}$ is time at moment i+1;
$t_i$ is time at moment i;
$V_{i+1}$ is the volume of solution at time $t_{i+1}$ that exists in the first container.

2. The method of claim 1, wherein the first anion composition B1 and/or the second anion composition $B_2$ has a concentration 0.001-14 mol anion/L; and/or the first cation composition $A_1$ has a concentration 0.001-6 mol cation/L.

3. The method of claim 1, wherein the first anion composition B1 and/or the second anion composition B2 is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$, or combination of the species; and/or
the first cation composition $A_1$ is at least one selected from the group consisting of Mg, Ca, Zr, Ti, V, Cr, Mn, Fe, Co, Ni, Cu, Al, in a form of sulfate, carbonate, chloride, nitrate, fluoride, oxide, hydroxide, oxyhydroxide, oxalate, carboxylate, acetate, phosphate or borate.

4. The method of claim 1, wherein method further comprises the following step:
feeding the second anion composition $B_2$ and the first cation composition $A_1$ into the reactor from the second time $t_2$ to a third time $t_3$, $t_3$ comes after $t_2$.

5. The method of claim 1, wherein during the initial time $t_0$ to the second time $t_2$, the first cation composition $A_1$ is the only cation that is fed into the reactor.

6. The method of claim 1, wherein from the initial time $t_0$ to the first time $t_1$, the first cation composition $A_1$ is fed through the second container into the reactor; and
feeding a second cation composition $A_2$ through a fourth container into the second container and feeding the second cation composition $A_2$ and the first cation composition $A_1$ through the second container into the reactor from the first time $t_1$ to the second time $t_2$, during which the first cation composition $A_1$ is gradually switched to the second cation composition $A_2$.

7. The method of claim 1, wherein from the initial time $t_0$ to a switching time $t_s$, the first cation composition $A_1$ is fed through the second container into the reactor, $t_s$ is between the first time $t_1$ and the second time $t_2$; and
from the switching time $t_s$ to the second time $t_2$, feeding a second cation composition $A_2$ and the first cation composition $A_1$ through the second container into the reactor, during which the first cation composition $A_1$ is gradually switched to the second cation composition $A_2$.

8. The method of claim 1, wherein the first cation composition $A_1$ and the second cation composition $A_2$ has a cation ratio of $Ni_xMn_yCo_zMe_{1-x-y-z}$, where x+y+z≤0.9, z≤0.2, "Me" is at least one additional metal elements selected from the group consisting of Mg, Ca, Zr, Ti, V, Cr, Fe, Cu and Al.

9. The method of claim 1, wherein a pH during the reaction is 7-13 which is gradually changed, the pH is 9.5-12.5 when precipitating hydroxides, the pH is 7-10 when precipitating carbonates; and/or a temperature during the reaction is 30-80° C.

10. The method of claim 1, wherein the step that the first anion composition $B_1$ is gradually switched to the second anion composition $B_2$ comprises the following steps:

at the first time $t_1$, the first container is full of the first anion composition $B_1$;

gradually feeding the second anion composition $B_2$ from the third container into the first container from the first time $t_1$ to the second time $t_2$, such that the first anion composition $B_1$ and the second anion composition $B_2$ form a dynamic mixture in the first container;

feeding the dynamic mixture through the first container into the reactor from the first time $t_1$ to the second time $t_2$;

at the second time $t_2$, the first container is mainly full of the second anion composition $B_2$.

11. The method of claim 6, wherein the step that the first cation composition Ai is gradually switched to the second cation composition $A_2$ comprises the following steps:

at the first time $t_1$, the second container is full of the first cation composition $A_1$i;

gradually feeding the second cation composition $A_2$ from the fourth container into the second container from the first time $t_1$ to the second time $t_2$, such that the first cation composition $A_1$ and the second cation composition $A_2$ form a dynamic mixture in the second container;

feeding the dynamic mixture through the second container into the reactor from the first time $t_1$ to the second time $t_2$;

at the second time $t_2$, the second container is mainly full of the second cation composition $A_2$.

12. The method of claim 7, wherein the step that the first cation composition Ai is gradually switched to the second cation composition $A_2$ comprises the following steps:

at the switching time $t_s$, the second container is full of the first cation composition $A_1$;

gradually feeding the second cation composition $A_2$ from the fourth container into the second container from the switching time $t_s$ to the second time $t_2$, such that the first cation composition $A_1$ and the second cation composition $A_2$ form a dynamic mixture in the second container;

feeding the dynamic mixture through the second container into the reactor from the switching time $t_s$ to the second time $t_2$;

at the second time $t_2$, the second container is mainly full of the second cation composition $A_2$.

13. The method of claim 8, wherein the first cation composition $A_1$ has a cation ratio of $Ni_xMn_yCo_zMe_{1-x-y-z}$, where x+y+z≥0.9, 0.75≤x≤1; 0≤0.1;; and/or the second cation composition A2 has a cation ratio of $Ni_xMn_yCo_zMe_{1-x-y-z}$, where x+y+z≥0.9, 0.3≤x≤0.7; 0.25≤y≤0.5, "Me" is at least one additional metal elements selected from the group consisting of Mg, Ca, Zr, Ti, V, Cr, Fe, Cu and Al.

* * * * *